United States Patent [19]

Garge et al.

[11] 4,080,609

[45] Mar. 21, 1978

[54] ELECTROLYTIC RECORDER WITH ADDITIONAL HELICAL CLEANING STYLUS

[75] Inventors: Yash W. Garge, Hudson; Kenneth G. Cranson, Lunenburg; Thomas C. Stockebrand, Boxborough, all of Mass.

[73] Assignee: Digital Equipment Corporation, Maynard, Mass.

[21] Appl. No.: 647,489

[22] Filed: Jan. 8, 1976

[51] Int. Cl.² ............................................. G03G 17/02
[52] U.S. Cl. .................................. 346/165; 29/121.4; 346/139 C
[58] Field of Search ............... 346/74 E, 74 ES, 74 S, 346/74 SB, 74 SC, 139 A, 139 C, 165, 164; 15/230, 3.15, 3.16, 3.17; 29/121.1, 121.2, 121.4

[56] References Cited

U.S. PATENT DOCUMENTS

| | | | |
|---|---|---|---|
| 2,693,992 | 11/1954 | Young | 346/74 E |
| 3,261,288 | 7/1966 | Dickerson | 29/121.1 |
| 3,451,084 | 6/1969 | Silver | 15/3.17 |
| 3,546,707 | 12/1970 | Dixon | 346/74 E |
| 3,611,425 | 10/1971 | Alden | 346/74 E |
| 3,644,931 | 2/1972 | Stringer | 346/74 E |
| 3,761,952 | 9/1973 | Simpkins | 346/74 E |
| 3,860,780 | 1/1975 | Conrad | 29/121.4 |
| 3,939,481 | 2/1976 | Mary et al. | 346/74 E |
| 3,956,754 | 5/1976 | Mary et al. | 346/74 E |
| 3,957,087 | 5/1976 | Johnston | 29/121.2 |

*Primary Examiner*—Jay P. Lucas
*Attorney, Agent, or Firm*—John M. Gunther; Thomas C. Siekman; Arthur W. Fisher

[57] ABSTRACT

A modular electrolytic recorder comprises four mechanical subassemblies and one electrical module for easy construction and replacement. Upon the chassis subassembly is mounted the anode subassembly including a flexible anode, a helix drum subassembly and a gear box transmission subassembly to which is attached the printed circuit board electrical module. Major features include: in the anode subassembly an easily replaceable, flexible anode comprising a plurality of essential discrete low mass integral springs for establishing good printing quality, the flexible anode having a reciprocating movement to provide for longer life and to maintain print quality; in the helix drum subassembly, a first wire for conducting current and a second dummy wire for cleaning the deposits left on the flexible anode to eliminate ghosting; and in the chassis subassembly, a drag roller for allowing movement of the paper through the electrolytic recorder only under positive feeding action as well as a detente arm which selectively disengages the paper from the drive mechanism so as to allow easy removal of the paper. Other features and characteristics forming part of the invention are more fully described in the detailed description.

4 Claims, 6 Drawing Figures

ELECTROLYTIC RECORDER WITH ADDITIONAL HELICAL CLEANING STYLUS

BACKGROUND OF THE INVENTION

1. Field of the Invention

This invention relates to hard copy output devices and more particularly to an electrolytic recorder which provides a dot matrix pattern for human readable hard copy output.

2. Description of the Prior Art

It is well known to provide hard copy output of information which is contained in a computer. One device used in conjunction with a computer to receive the computer's information is a recorder. The recorder contains a role of chemically treated paper which is passed through two conducting electrodes which provide electrical imprints upon the paper. The variations in electrical signals impressed on the electrodes cause variations in the darkness of a visible record produced by the electrical signal on the paper. Such recorders, however, have in the past been quite large and expensive and this has limited their use to sophisticated facilities.

One of the many problems that has prevented the development of inexpensive recorders has been the high manufacturing tolerances and consequent high manufacturing expenses associated with such recorders. This has been caused in no small part by the many different parts which have been required in the past to produce such a recorder. In addition to having numerous precision parts, these parts have not been easy to install or repair and as a result, replacement for such devices has been extremely time consuming and also expensive. Moreover, the reliability of such devices has not been good.

While some inexpensive recorders have been introduced, the quality of hard copied information printed out from such inexpensive recorder has been less than adequate. This results from several problems such as inadequate manufacturing tolerances, poor contact between conducting electrodes, improperly stored chemical paper, etc. These and other problems have resulted in limited usage of such recorders.

OBJECTS OF THE INVENTION

It is therefore a primary object of the present invention to overcome the above cited problems and provide an electrolytic recorder which is simple in construction, inexpensive to manufacture and provides useful service for an extended time period and, therefore, adaptable to widespread use.

It is another object of the present invention to provide an electrolytic recorder comprised of modular subassemblies to provide for easy construction and replacement.

It is still another object of the present invention to provide an electrolytic recorder in which the usuable and replenishable parts are easily replaceable, therefore, increasing the operational time of the recorder.

It is still yet another object of the present invention to provide an electrolytic recorder which is suitable for mass manufacturing and which is characterized by low manufacturing tolerances while still providing the above advantages.

SUMMARY OF THE INVENTION

The electrolytic recorder of the present invention alleviates the above cited problems of the prior art by providing a modularly-constructed device which comprises four mechanical subassemblies. Each of the subassemblies is easily replaceable and has low manufacturing tolerances.

More particularly, the subassemblies include a chassis subassembly which functions to support the rest of the subassemblies as well as a chemically treated paper roll. Coupled to the chassis subassembly is an anode subassembly which electrically conducts to the helix subassembly through the paper for recording data and mechanically assists the transmission of the paper through the electrolytic recorder. The helix subassembly, in addition to receiving current from the anode assembly for recording data, also includes means to eliminate the ghosting problem presented in the prior art. Finally, integrally coupled with the chassis, anode and helix subassemblies is a gear box transmission subassembly which controls the driving of the various parts in the recorder.

Each of the subassemblies comprises various parts which aid in the low-cost simple device which forms part of the invention. The details of these subassemblies are found in the detailed description of the present invention.

BRIEF DESCRIPTION OF THE DRAWINGS

Various objects, features and advantages for the electrolytic recorder in accordance with the present invention will be apparent from the following detailed discussion together with the accompanying drawings in which.

DETAILED DESCRIPTION OF THE PREFERRED EMBODIMENT

Figure 1:
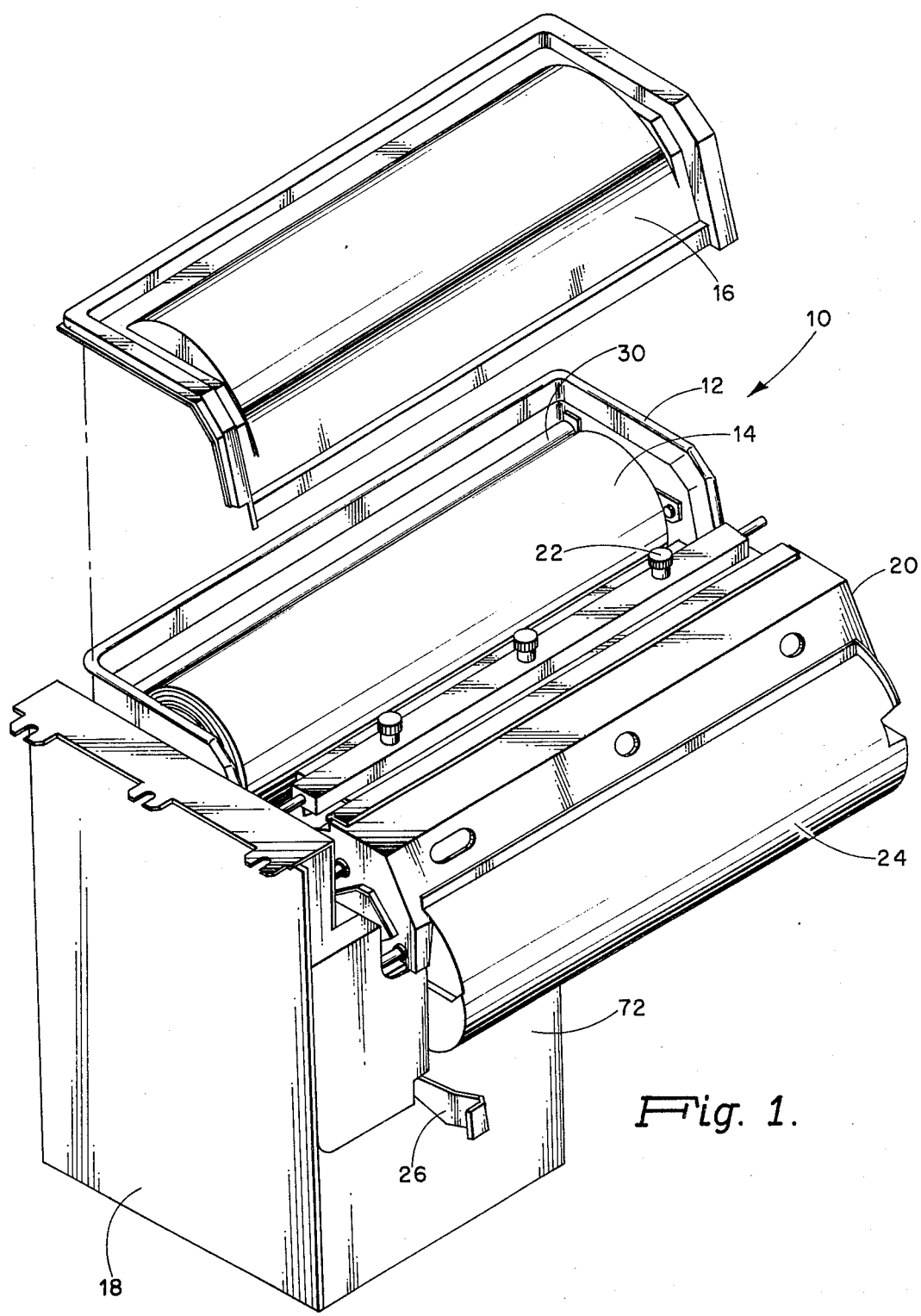
FIG. 1: is a right upper perspective view of the electrolytic recorder.

Referring to FIG. 1, an electrolytic recorder 10 is shown which may be used either as an independent unit such as a hard copy printout terminal to a computer system or, alternatively, may be incorporated into a video display device and/or be part of it. Because of the few parts which are required for the instant electrolytic recorder and because of its ease of replacement as well as its smallness in size, in this preferred embodiment, electrolytic recorder 10 is made part of a video terminal display device in which a hard copy output of the video information is presented. In this regard, Ser. No. 571,139 dated Apr. 24, 1975 to Micheal Leis and Russell C. Doane and Ser. No. 516,348 dated Oct. 21, 1974 to Thomas C. Stockebrand, Russell C. Doane and Michael D. Morganstern describe the video terminal to which the instant application relates. These Patent Applications describe the features of the video terminal system which provide the input to this electrolytic recorder in order to have a hard copy output of the alphanumeric information.

More particularly, FIG. 1 shows a chassis subassembly 12 which holds a paper roll 14. Chassis subassembly 12 is the main structural part of recorder 10 and may be made of sheet metal. Chassis subassembly 12 comprises a U-shaped receptacle 13 having two integral end flanges. Within the chassis subassembly 12 is located a paper roll 14 including a center roller portion 15. The paper roll 14 comprises a chemically treated paper which is able to receive ferrous ions making impressions thereon. Thus, the passage of electrical current causes the chemicals in the paper to change color and leave a visual image. There are many examples in the prior art of suitable paper, such as U.S. Pat. No. 3,354,058 to Ives and U.S. Pat. No. 3,557,946 to Sviokla which show moist papers which work well in electrolytic recorders.

In order to keep the paper moist, a humidor 16 including a humidor rubber seal 42 (FIG. 3), is snapped on the upper and forward edges of chassis receptacle 13. The humidor comprises two sections and is formed of a mylar shield. The upper section is essentially L-shaped and conforms to the chassis subassembly 12. The upper section at the bottom of the L has a protruding mylar front flap. The lower section of humidor 16 sits in receptacle 13 and conforms to the bottom and sides of receptacle 13 and may also have a protruding mylar flexible front flap 44. The humidor 16 forms a complete moisture sealed unit for the paper roll 14. The lower section also may include at its underneath moisture holding wet felt material which will maintain a moisture content vis-a-vis the helix subassembly. The humidor and chassis subassembly are more particularly shown in FIGS. 2 and 3.

Connected to the chassis subassembly is an integral gear box transmission subassembly. Gear box subassembly 18 houses the necessary mechanical drive mechanisms as well as various gears and other transmission couplings. The drive mechanisms provide for complete mechanical movement of the paper drive roll and other elements in the electrolytic recorder.

Coupled to the gear box subassembly 18 and the chassis subassembly 12 is the anode subassembly 20. The anode subassembly 20 forms part of the recording apparatus which provides for the impregnation by electrical means of signals onto the paper in order to form the hard copy output of the visual impressions desired. The anode subassembly 20 is secured to chassis subassembly 12 by screws 68. The pivoting of the anode subassembly occurs on an axis defined by the connection of the anode subassembly to the chassis subassembly at screws 68.

The anode subassembly 20 has an anode holder assembly 21 secured by locking screws 22 which abut the various components comprising the anode holder assembly. These screws 22 have snap rings 23 at their other end, the snap rings ensuring that screws 22 are never removed. When loosened, screws 22 enable easy replacement of a consumed anode, and when tightened, screws 22 secure each component of the anode holder assembly.

FIG. 1 also shows dustpan 24 which maintains a high degree of moisture around the helix drum (shown in FIG. 2) and collects salts and paper debris. Dustpan 24 is formed of a plastic material and is secured to the chassis subassembly by any well-known means.

Finally, FIG. 1 shows a detente arm 26 coupled to the left flange of the chassis subassembly and in abutting relationship to the anode subassembly. Detente arm 26 is sufficiently spaced from the recorder 10 so as to allow independent movement. When engaged, detente arm 26 causes a slight rotating of the anode subassembly 20 at the axis defined by anode screws 68. This rotation causes the subassembly 20 to be lifted. When the anode subassembly 20 is lifted, the copier is inhibited; conversely, however, the paper 14 may now be advanced by hand in case a quick copy of the printed information is required. In addition, engaging detente arm 26 renders the electrical connections to the anode subassembly 20 inoperative such that no recording of information is possible.

Figure 2:
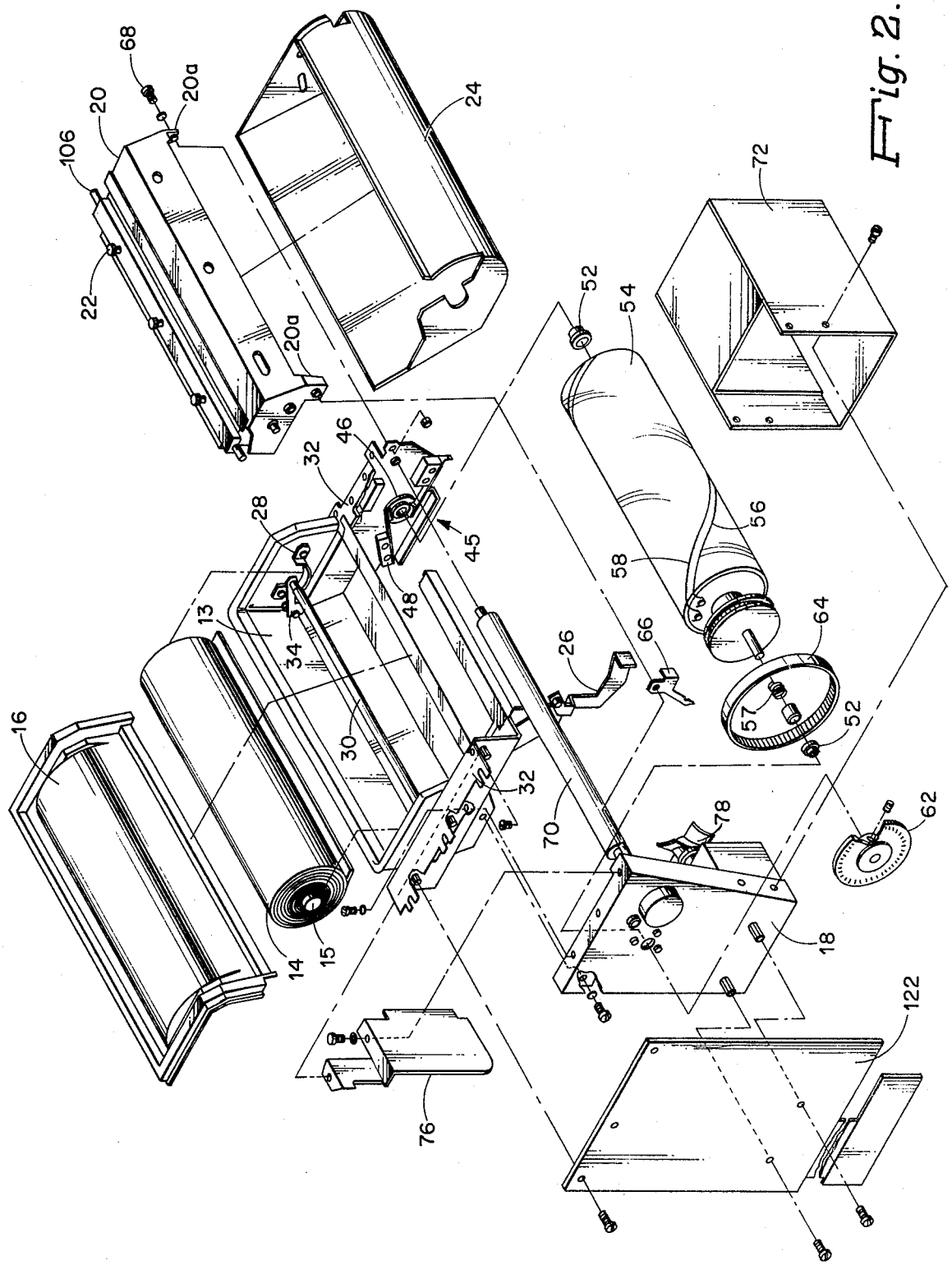
FIG. 2: is a right upper perspective view of some of the subassemblies within the electrolytic recorder with various parts broken out.

A broken out picture of the items of the electrolytic recorder 10 are shown in more graphic detail in FIG. 2. More particularly, FIG. 2 shows a pair of essentially U-shaped support brackets within the integral end flanges of receptacle 13. Support brackets are fastened to receptacle 13 by normal means such as pop rivets 38. The roller 15 of the paper roll 14 sits on support brackets 28. Roller 15 may be made of hard plastic and moves easily when the paper is transferred through the recorder 10.

An arm assembly 31 is located immediately behind the support brackets 28 and is coupled to chassis receptacle 13 by normal means. The arm assembly comprises drag roller 30, spring 36, L-shaped arm 37 and screws 38 fastening arms 34 to receptacle 13. Springs 36 have a long portion 39 which favorably biases the long section of arm 34. The arm 34, in turn, forwardly biases the drag roller 30 which abuts paper roll 14. The drag roller 30 is free floating and biases paper roll 14 in a direction opposite the movement of paper roll 14. The combination of springs 36 and arms 34 biasing roller 30 ensures that a positive feeding action must be imparted to the paper roll 14 in order for the paper to be moved. Moreover, the combination creates a drag on the paper roll 14 which hinders the paper from being pulled out by the frictional pull of fast forwardly rotating helix drum. This also prevents paper jamming. Finally, use of this biasing mechanism controls the movement of the paper which, in turn, results in a higher quality printout on the paper since the spacing of the paper is tightly controlled.

Again, referring to FIG. 2 and looking at the right flange of chassis subassembly 12, there is shown the electrical commutators 45 for enabling conduction of the electrical signals to the cathode which is part of the helix subassembly. The commutators 45 are mounted to the chassis subassembly 12 and include a slip ring assembly 46 and slip ring brushes 48. Both the brushes 48 and slip ring assembly 46 are well known in the art. The brushes 48 are mounted on a non-conducting block and, as is well known, are made of nylon phenaloc material. The brushes transfer the electrical current to the cathode when a dot pattern is to be presented on the paper.

The cathode brushes of the slip ring subassembly 46 have at their center a helix shaft 50 which rotates on ball bearings. The helix shaft is free floating and biased against spacer 52 by spring 57. Coupled to the helix shaft 50 is a plastic polycarbonate cylindrical drum 54 with wires 56 and 58 wound around the circumference of drum 54. The wires 56 and 58 conform naturally to the drum surface. Wires 56 and 58 are supported at both perpendicular ends of the drum 54 by screws 60. Wire 56 is the electrically conductive cathode wire which is connected to the cathode brushes 48 and slip ring 46. Wire 58 is a dummy wire which is used to eliminate the ghosting problem. Wire 58 is set behind wire 56 by a predetermined amount such as (10°).

In construction, drum 54 is placed on helix shaft 50 and secured thereto by a roll pin. Shaft 50 is supported at one end by the chassis subassembly 12 and at the other end by the gear box subassembly 18. Gear box subassembly, in turn, is mounted on the chassis subassembly 12.

Integral to the helix drum is a timing device which includes an essentially circular photoencoder wheel 62 and photosensor assembly (not shown). In operation as the photoencoder wheel rotates, it causes triggering of electrical pulses, each pulse resulting in an electrical current between the anode and cathode. As this electrical current passes through the paper, it creates a dot pattern on the paper. Drum 54 has constant rotation and is located within the moisture holding dustpan 24. As drum 54 rotates, it keeps the moisture content of the drum at a certain value so that paper recording is provided. Plastic dustpan 24 is snapped into place when recorder 10 is assembled.

As the electrical charge is transferred from the cathode wire 56 to the anode, the combination of the shape of the electrodes, the pressure between the anode and cathode, the direction of rotation of the helix drum, the movement of the paper and the electrical charge cause a pool of chemical deposits or residue to build up on the anode. This residue changes the contact characteristics between the anode and the cathode through the paper and results in what is known as a "ghosting" problem. Stated differently, because of the drag, a residue is left behind the anode, and the resolution of the dots is changed resulting in a "ghosting" phenomenon. One of the ways which has been found by this invention to overcome this problem is to provide a dummy wire 58 in the contained environment of dustpan 24. Dummy wire 58 wipes against the anode through the paper substantially removing the pool of chemical deposits on the paper. This increases the resolution of the dots on the paper and reduces what is commonly referred to as "ghosting."

The ghosting problem is noticeable as a second mark which appears on a line after the first mark has been made. The use of the dummy wire 58, which is displaced and phase shifted slightly from the conducting wire 56, will, within a short predetermined time, come to the point where the dot had been originally placed by the combination of the anode and the cathode wire 56. Dummy wire 58 rubs against the anode through the paper at this point and wipes the flexible anode and the paper clean. Since this action occurs in such a short period of time later and reacts to the previous mark made, its effects are sufficient to eliminate the ghosting effect.

Another concern which is experienced in the recording of data is the "blocking" problem. Blocking results from the drying and hardening of the residue. It includes the accumulation of paper, paper lint and fibers and salts on the cathode wires. To alleviate this problem, the moisture content in dustpan 24 is maintained at a high level. Thus, drum 54 is kept moist by:

1. the wet felt insert which supplies moisture for the area including the helix drum; and
2. the anti-blocking dustpan 24 which retains the moisture in the drum area. Because of the moisture, the cathode wire remains relatively free of residue and hence, the "blocking" problem is eased.

Figure 3:
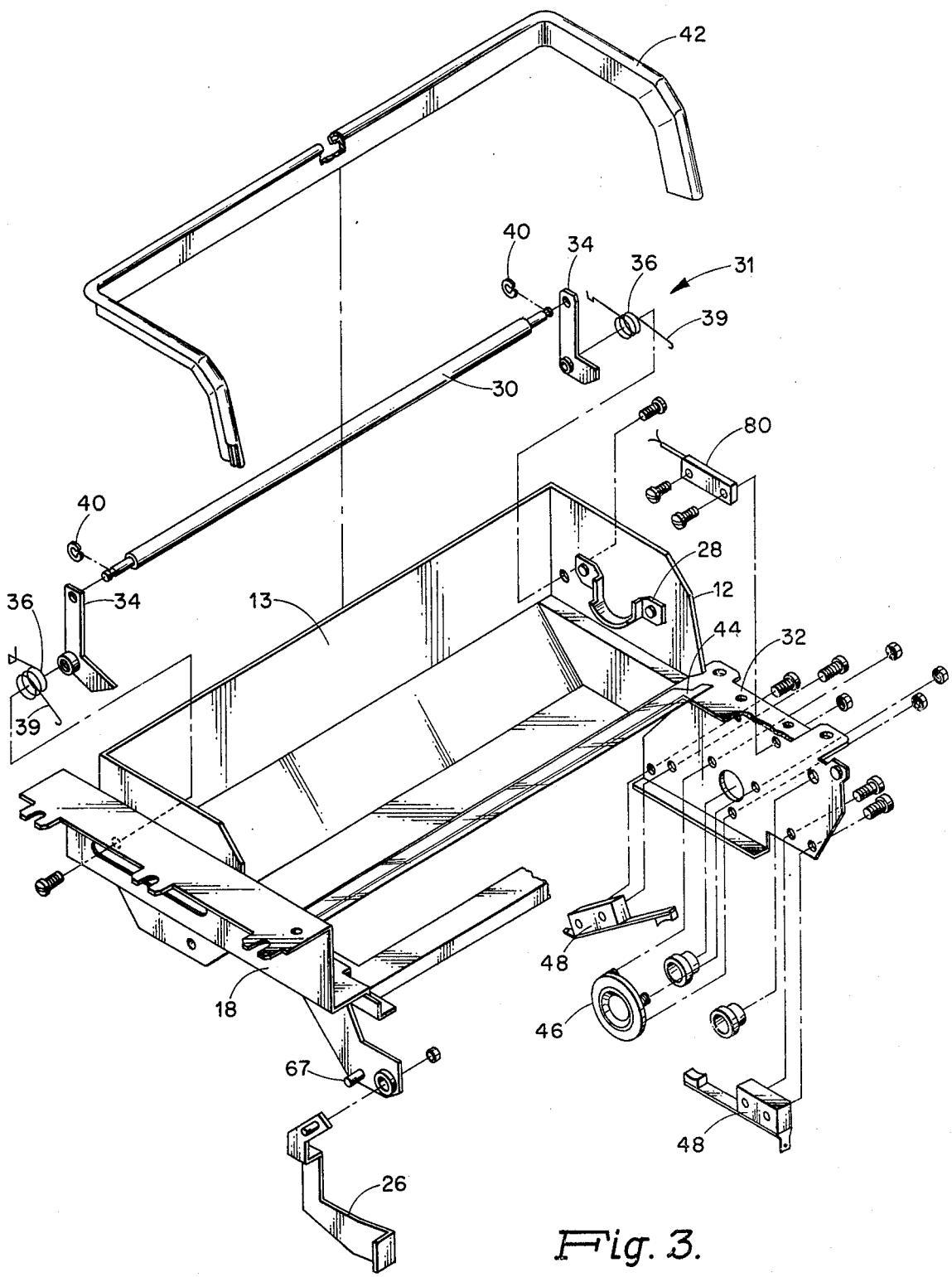
FIG. 3: is a perspective view of the chassis subassembly.
Figure 5:
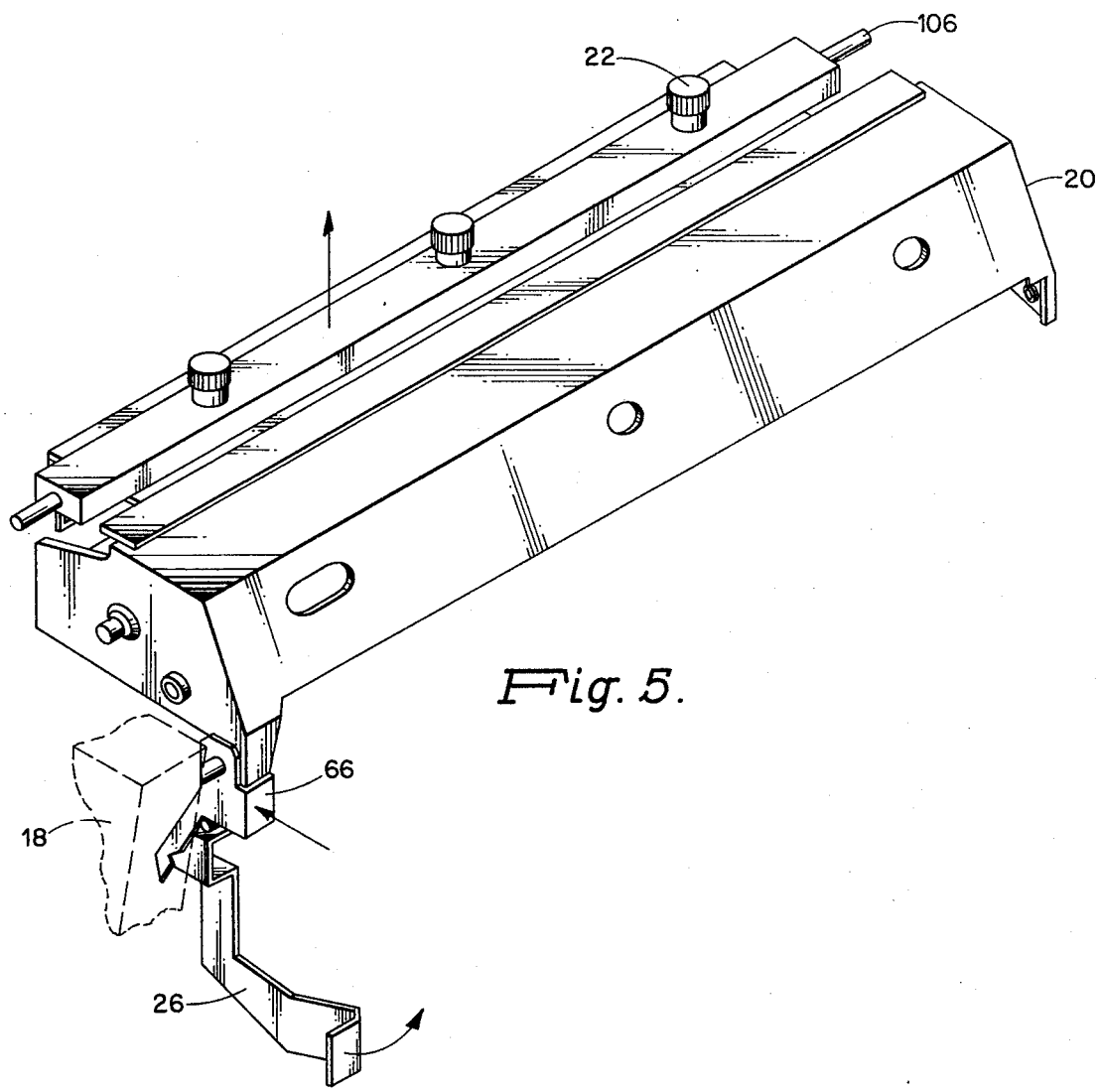
FIG. 5: is an assembled view of the detente arm mechanism.

FIG. 2 and FIG. 3 show in greater detail detente arm 26 which is readily accessible by a person from the outside of the electrolytic recorder. The detente arm 26 is secured by a screw to the chassis subassembly 12. In close physical proximity to detente arm 26 is a detente feeder arm 66. Feeder arm 66 is secured to the anode subassembly 20 by anode pivot stud (not shown). The anode subassembly has one axis of rotation defined by this connection. In normal operation, the detente arm 26 does not engage feeder arm bracket 66. Thus, detente arm 26 has no effect on the copier operation. As the detente arm is lifted up, it engages feeder arm 66 (FIG. 2) and forces it slightly upwards and backwards from its initial position. Concurrently, the front portion 66a (see FIG. 5) of the feeder arm 66 engages the lower left flange 20a of anode subassembly 20 and imparts a slight upward movement to anode subassembly 20. This upward movement separates the drive roll from the pinch roll such that the recorder transmission can impart no movement to the paper. Moreover, this movement allows the paper to be pulled out by hand. Thus, if a hard copy had just been made of the data, the engaging of the detente arm would allow the paper to be easily advanced forward and ripped off so that an immediate copy of what has been recorded was received. FIG. 5 shows the assembled version of FIGS. 2 and 3.

FIG. 2 also shows gear box 69 as part of gear box subassembly 18. Gear box 69 contains a motor (not shown) which provides the movement to various parts of the recorder 10. Gear box 69 drives both a drive roller 70 as well as the helix drum 54. As will be subsequently seen, these components 54 and 70 enable the paper to feed through the electrolytic recorder. Since the motor in gear box 69 has an electrical field, it is insulated from other components in the system by a shield 72. In addition, gear box subassembly 18 has a wing cover 76 for protecting the feeder arm 66 and a fan 78 for cooling the entire recorder.

Figure 4:
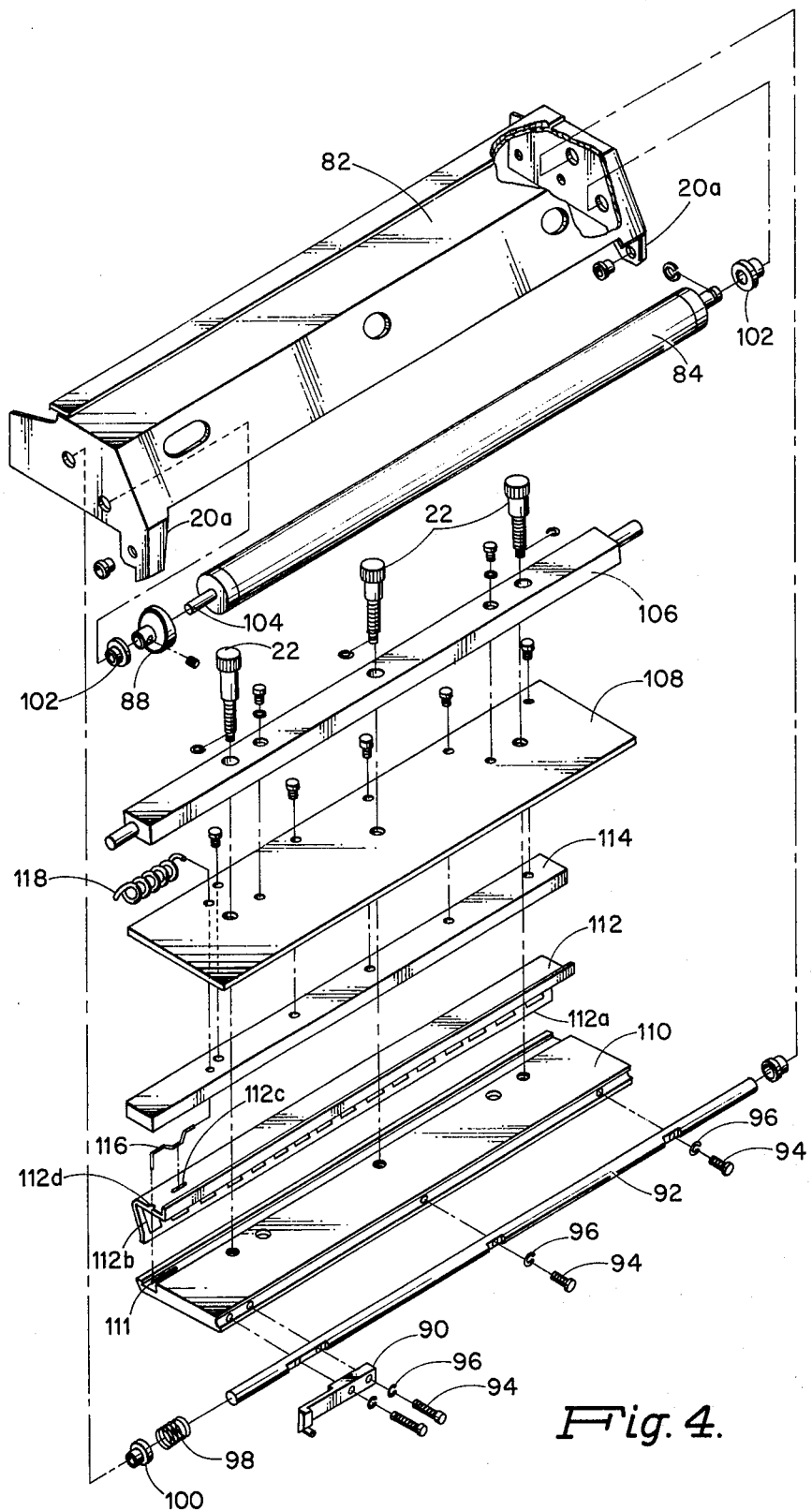
FIG. 4: is a right perspective view of the anode subassembly.

In operation, the motor in gear box 69 drives helix drum 54 and drive roller 70 which, via the paper 14, moves the freestanding pinch roller 84 (FIG. 4). This results since pinch roller 84 is under a constant pressure from the anode subassembly forcing it to abut the drive roller 70. The helix drum has a tendency to pull the paper faster than it should be moved. This tendency of paper movement, however, is controlled by the drag assembly 31 previously described. Because of drag assembly, only the positive movement of the paper caused by helix drum 54 and drive roller 70 occurs thus ensuring that proper printing and spacing of the data from the recorder results.

Also coupled to the gear box subassembly 18 is a printed circuit board 74. The printed circuit board subassembly 74 contains the electronics in the form of integrated circuits which are necessary to provide the electrical impulses to the anode and cathode in order to have the printing occur.

In addition, printed circuit board 74 provides electrical sensing of the end of the paper when the paper roll 14 has been completely used and a wet paper sensor for making sure that the paper receiving the ferrous ions from the conducting of the cathode and anode is wet. The end of paper sensor (not shown) automatically shuts off the electrical current between the cathode and anode when the paper has ended. This prevents the cathode electrode from pitting because of excessive arcing. The wet paper sensor (not shown) monitors the moisture condition of the paper. It will not allow printing until the paper has a desirable wetness. This also helps in preventing the blocking problem.

At the opposite end of the gear box subassembly 18 is the right flange 32 of the chassis subassembly 12. The front forward position of flange 32 holds the drive roller 70. Drive roller 70 frictionally abuts pinch roller 84 (FIG. 4) through paper 14 so as to feed the paper through recorder 10. The drive roller 70 and pinch roller 84 are formed of rubber which has a shore A darometer rating between 60 and 80 and approximate physical diameter of 19 millimeters. The drive roller should have a higher darometer rating than the pinch roller for good contact.

In addition, the right flange 32 also contains a reed switch 80 which provides for the electrical engagement of the cathode brush 48. When the detente arm 26 is lifted, the movement imparted to anode subassembly 20 results in its electrical disengagement. Moreover, reed switch 80 is also disengaged so that no electrical current is provided to the cathode thus preventing any shock from being absorbed by the person using the unit.

In FIG. 2, there is generally illustrated in general format the anode subassembly 20. This is more particularly shown in FIG. 4 which shows the complete anode subassembly.

Anode subassembly 20 includes an anode carrier 82 which is an inverted U-shaped aluminum member and contains supports for the pinch roller 84 as well as various parts of the anode subassembly. Pinch roller 84 is set on a shaft 104 and secured by a retaining ring.

Figure 6:
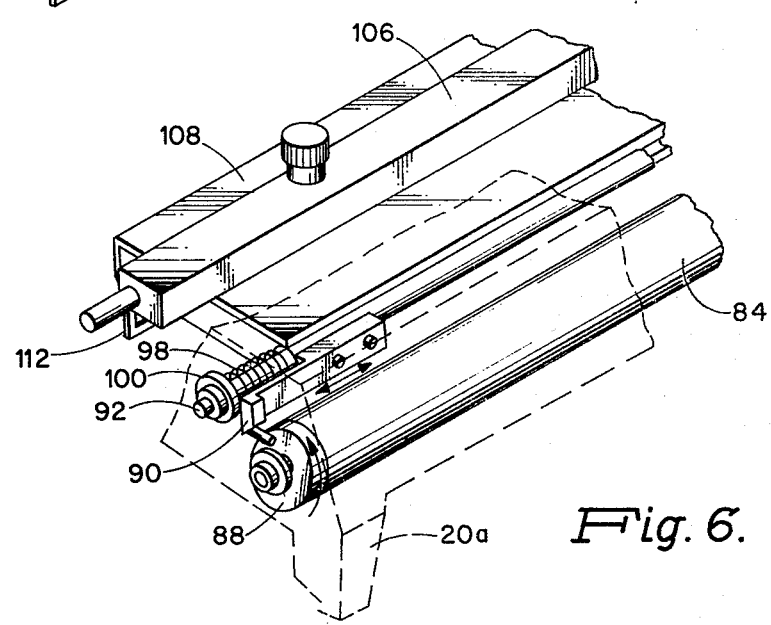
FIG. 6: is an assembled view of the anode arm mechanism.

At one end of pinch roller 84 is an open face cam 88 for physical interconnection to a cam assembly 86. The cam assembly 86 includes a cam follower 90 attached to an anode shaft 92 via socket screws 94 and lock washers 96. Cam assembly 86 floats freely within its snap bushings 100. Also connected on the anode shaft 92 is a dither spring 98 which is located between cam follower 90 and delrin snap bushings 100 to form a tight cohesive unit mounted on shaft 92. Dither spring 98 keeps the cam assembly 86 justified against the open-faced cam 88. Since the cam is only single-faced, the contact between the open-faced cam 88 and the cam follower 90 is such that it is always under constant pressure as can be seen in FIG. 6.

The interaction between the pinch roller 84 and anode shaft 92 is such that as the pinch roller 84 rotates the cam 88 also rotates and engages the cam follower 90. The cam follower, in turn, is secured to anode holder assembly 21. When the cam follower moves, it causes the entire anode holder assembly to move back and forth. This results in even wear occurring on the anode itself since the dither spring 98 will force the cam follower 90 to go back to its leftmost position. The spring 98 is light enough so that under stationary conditions it doesn't have enough force to bring the cam follower back to its place; however, in operation, the vibrations of the recorder causes the whole anode holder assembly to move. Thus, cam assembly 86 takes advantage of the movement of the drive roller 70 and the paper in order to operate properly. No external forces, linkages or other mechanisms are required to make cam assembly 86 function.

The acetal snap bushings 102 are used for the drive roll shaft, the pinch rollers and the anode shaft in order to provide a freely rotating, completed assembly. It is well known that an acetal bushing is a snap type of bushing which always stays in place once assembled onto the housing.

The anode subassembly 20 has two axes for rotational movement. The first axis involves anode subassembly 20 and screws 68 previously desired. The second axis involves the anode holder assembly and is centered on shaft 92. The anode holder assembly is coupled to the anode carrier 82 by shaft 92. The anode holder assembly includes a reciprocating anode counterweight 106. Counterweight 106 provides for the physical abutting of the anode to the cathode wires 56 and 58. When the anode holder is in its operational position, the counterweight 106 provides the pressure needed to maintain good physical and, hence, good electrical contact between the anode and cathode wire with the paper in between. The counterweight provides an additional effect in that it loads down the entire anode subassembly 20 thereby providing the necessary constant pressure between the drive roller 70 and the pinch roller 84 which causes paper 14 to be fed through the recorder 10. Moreover, the counterweight eliminates floating rollers, as is common in the industry, and thereby provides a much simpler assembly. The counterweight 106 provides loading to anode which is designed to overcome manufacturing tolerances and still maintain even printing pressure.

Immediately below the anode counterweight in FIG. 4 and part of the anode holder assembly is the upper anode holder 108 which together with the lower anode holder 110 provides a firm abutting surface in which to provide the flexible anode 112 along with the anode insulator 114. The upper and lower anode holders are secured by means of the anode clamp screws 22 to provide good abutting relationships and firmly fix the flexible anode 112 in place. The anode insulator 114 ensures that the electrical conduction only occurs through the flexible anode 112. Both upper and lower anode holders are made of hard plastic. Lower anode holder 110 includes a groove 111 for sliding the flexible anode 112. At the end of the groove 111 is a perforation 111a for a contactor clip 116. The contactor clip 116 is used to locate the flexible anode 112.

Flexible anode 112 is made out of fully hard stainless steel. It is configured as an elongated, essentially L-shaped plate having two strips. The writing edge 112a is straight stainless steel edge 120 of 0.006 inches thick and ⅛ of inch high. Adjacent the writing edge 112a are a plurality of holes 112b which result in the anode having a number of low inertia springs which are easily bendable. When edge 112a engages wires 56 and 58 it is displaced to the contour of each wire. Not only does this increase the amount of electrical current which flows between the anode and cathode because of the larger contacting surface, but is provides a secured physical arrangement.

The flexible anode 112 has its second edge shaped such that it easily slides into the lower anode groove 111 and is located by slot 112c which receives contactor clip 116 and pin hole 112d. Pin hole 112d receives the end of pigtail assembly 118. When the anode 112 is consumed it is merely slipped out of anode holder assembly 21 once the screws 22 are loosened. A new anode 112 is then slipped in until the left side of the contactor clip 116 engages slot 112c and pigtail assembly 118 engages pin hole 112d. The screws 22 are then tightened to form a secured assembly.

In operation, the flexible anode 112 receives current from both the contactor clip 116 and pin of pigtail assembly 118. The flexible anode, as it conducts current, becomes used up and deformed. This process is slowed by the cam relationship which ensures that the same metal part of the flexible anode 112 is not constantly being used. Stated differently, if the reciprocating relationship provided by cam follower 90 was not established, the first dot pattern for a line would always abut the same part of the flexible anode 112. Thus, the reciprocating relationship increases its useful life of the anode by evenly distributing the wear along anode 112.

The anode subassembly may be moved by physically lifting the whole anode subassembly 20 based on an axis of rotation around screws 68 or, alternatively, may be slightly moved by the action of detente arm 26. Both movements disengage the pinch roller 84 from the drive roller 70 and thereby stop movement of paper 14. Moreover, when the anode subassembly 20 is physically lifted, the axis of rotation for the counterweight defined by shaft 92 moves the anode holder assembly further forward thereby providing additional support for the anode subassembly 20 to remain in an upright position.

As has been shown, the electrolytic recorder comprises the anode subassembly which includes a flexible anode, the chassis subassembly, the gear box subassembly, the helix drum subassembly and the printed circuit board subassembly. The four basic mechanical modules, moreover, have a definite, easily replaceable relationship among each other. The modularity of the entire assembly provides for easy replacement of each unit, especially the paper roll and the flexible anode which becomes deformed. This differs from prior art devices which were cross linked and are not able to be removed from each other, whereas, in the present invention all four subassemblies can be pulled out separately and be put together.

The advantages provided by the electrolytic recorder of the present invention have been shown. These include the helix drum containing a double wire 56 and 58 in which the first wire 56 conducts the cathode current and the second wire cleans the deposits left on the flexible anode thereby eliminating the ghosting problem. Both wires are tensioned at each perpendicular end of drum 54 and thereby eliminate the need for performing or pregrooving the helix drum.

A flexible anode has also been disclosed which is biased in the direction of the movement of the paper. The flexible anode comprises a plurality of essentially low mass areas each resilient and displaced only by contact with the cathode wires 56 and 58. Because the anode is constituted as a low intertia integral spring, the double wire arrangement is able to be used. Electrical conduction through the anode occurs via the contactor clip 116 located in the anode subassembly 22. The clip also serves a function of enhancing removal of the consumed anode 112. Deformation of flexible anode 112 is limited by the continuous reciprocating movement introduced by the cam follower 90, arrangement 88 and 90. The lateral movement of the anode is so controlled that the first letter of each word is not printed in the same location.

In addition, a detente arm 26 has been shown which separates the pinch roller 84 from the drive roller 70 to enable removal of the paper after a printing operation has been completed.

Finally, a gear box has been provided for the movement of the helix rollers and paper as opposed to the typical belts and pulleys which have been previously disclosed in the prior art.

Thus, it can be seen that the electrolytic recorder of the present invention provides for low component tolerances and low assembly tolerances because of the various constructions involved. These manufacturing tolerances are able to be minimized because of the flexible nature of the anode and helix configurations. Moreover, because of this configuration, there is a uniform pressure applied between the anode and cathode wires such that the wiring quality provided on the paper is excellent. The ghosting problem of having the dots transferred to subsequent lines had been removed by the double helix wires.

It is obvious that changes may be made in the form of construction of the invention without departing from the material spirit thereof. It is not, however, desired to confine the invention to the exact form herein shown and described, but it is desired to include all such changes as may properly come within the scope of the invention as claimed.

The invention having thus been described what is claimed as new and desired to be secured by Letters Patent is as follows:

1. An electrolytic recorder for providing a copy of data on a chemically treated paper roll, said recorder comprising in combination:
   A. means for driving said paper roll through said recorder;
   B. means for supporting said driving means and said paper roll;
   C. means coupled to said driving means for conducting an electrical current, said conducting means comprising a pair of electrodes for transferring said electrical current through said paper rolls, said paper rolls having formed on its surface pools of chemical deposits in response to said electrical current; and
   D. means for substantially eliminating said pools of chemical deposits on said paper roll, said eliminating means comprising non-conductor means spaced behind one of said pair of electrodes for physically abutting the other of said electrodes through said paper roll subsequent to the formation of said pools of chemical deposits.

2. The recorder as defined in claim 1 wherein one of said electrodes is an anode and the other of said electrodes is a cathode and wherein said driving means includes:
   A. a drum of cylindrical configuration, said cathode connected to the perpendicular end of said drum and wound circumferentially around said drum to conform to a helical configuration; and
   B. wherein said non-conducting means is also connected to said perpendicular ends of said drum and wound circumferentially around said drum to conform to a helical configuration.

3. The recorder as defined in claim 2 wherein said non-conducting means is phase shifted in parallel and disposed behind said cathode, the distance between said cathode and said non-conducting means being sufficient to allow said non-conducting means to substantially eliminate said pool of chemical deposits on said paper roll.

4. The recorder as defined in claim 3 wherein:
   A. said anode is flexible and formed of electrically conductive material and biased in the direction of movement of said paper roll through said recorder;
   B. said anode comprises a plurality of essentially discrete low-mass areas, each discrete low-mass area resilient and displaced only by contact with said cathode and said non-conducting means; and C. said anode when abutting said non-conducting means causing said pool of chemical deposits to be placed into essentially the same area of said paper roll as the dot pattern created by said electrical current between said cathode and said anode.

* * * * *